June 21, 1932.  R. E. BREWER  1,864,405
SICKLE BLADE REMOVER
Original Filed March 24, 1931
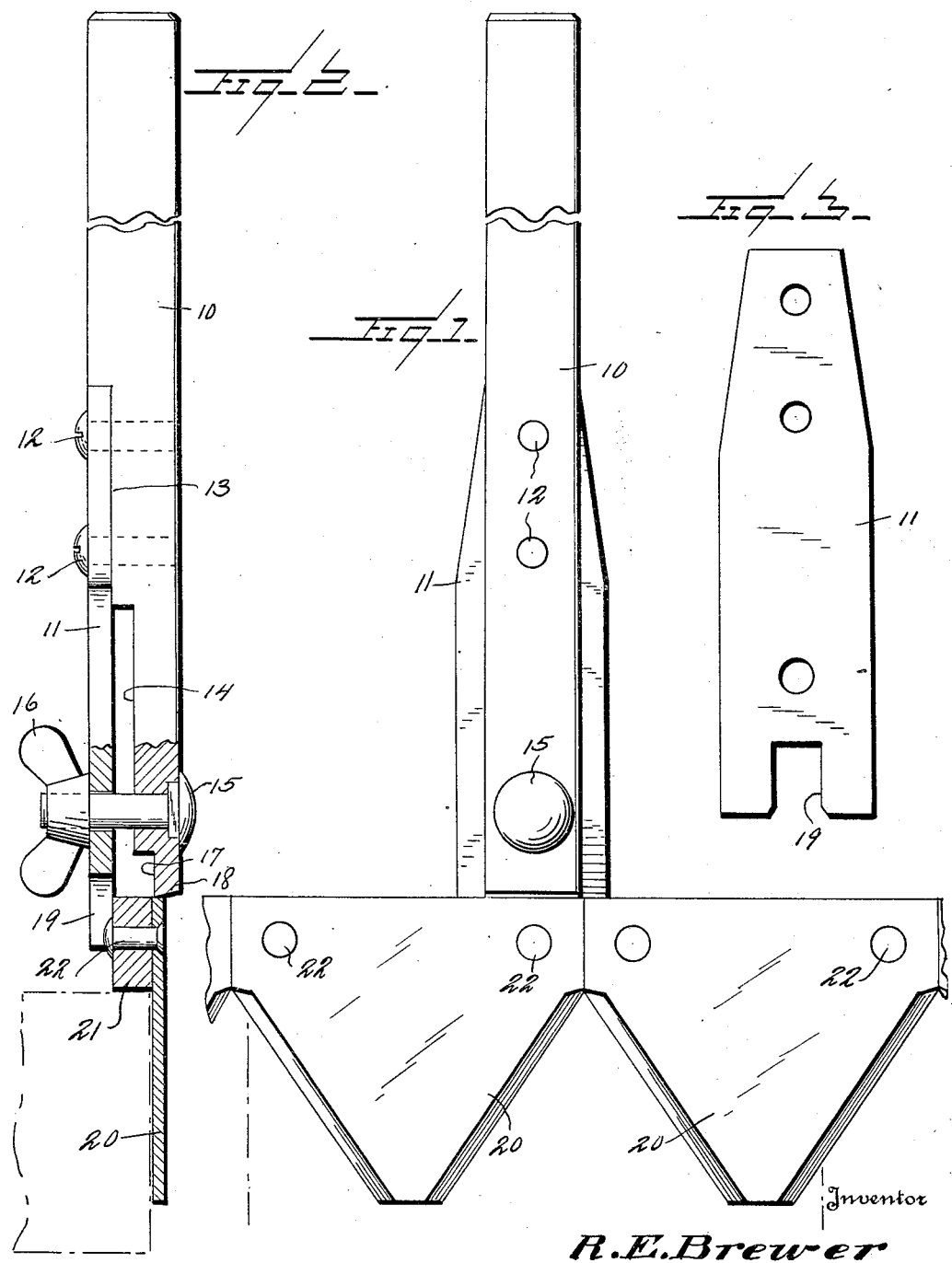

Patented June 21, 1932

1,864,405

UNITED STATES PATENT OFFICE

ROBERT E. BREWER, OF VALLEY FALLS, KANSAS

SICKLE BLADE REMOVER

Application filed March 24, 1931, Serial No. 524,963. Renewed April 14, 1932.

This invention relates to implements for removing broken articles from cutting machines or the like, and more particularly to means for removing broken teeth or blades from binders, mowing machines, headers or combines.

An object of this invention is to provide an implement of this kind by means of which the broken blades may be readily removed from the blade carrying bar so as to eliminate the use of a cold chisel for shearing off the rivet heads holding the blades on the bar.

Another object of this invention is to provide a device of this kind having adjustable guide means so that the blade engaging member can be readily held into contact with the broken blade.

The above and various other objects and advantages of this invention will in part be described in and in part be understood from the following detailed description of the present preferred embodiment, the same being illustrated in the accompanying drawing, wherein:—

Figure 1 is a detail top plan view of a device constructed according to the preferred embodiment of this invention;

Figure 2 is a detail side elevation partly broken away, and

Figure 3 is a plan view of the resilient guide member.

Referring to the drawing wherein like numerals of reference designate corresponding parts throughout the several views, the numeral 10 designates generally a handle or shank of a device constructed in accordance with the preferred embodiment of this invention, this shank being of elongated construction and having a resilient guide member 11 secured to one face thereof and extending longitudinally of the bar or shank 10, one end of the guide member 11 extending outwardly of the adjacent end of the member 10.

The shank member 10 is provided with a recess 13 within which the resilient guide member 11 is seated, this guide member 11 being held in place by means of bolts or screws 12 or the like. The outer surface or face of the guide member 11 may be disposed substantially flush with the face of the member 10, and this member 10 is also provided with a second recess 14 which provides a space within which the guide member 11 may be moved by means of an adjusting bolt 15 which is carried by the forward end of the shank or body member 10. The bolt 15 may be provided with a thumb nut 16 so that the guide bar 11 may be readily sprung or moved toward the shank 10 adjacent the outer end thereof. The shank or body 10 is also provided with a third recess 17 disposed forwardly of the second recess 14 which provides an offset head portion 18 at the forward end of the elongated member 11.

The guide member 11 is provided at the forward end thereof with a rearwardly extending notch 19 which opens outwardly of the forward end of the guide member 11 and which is adapted to be disposed about a rivet head used for securing a cutter blade 20 on a ledger bar 21.

In the use of this device, where a blade 20 has become broken or damaged to such an extent that its removal is necessary from the ledger bar or plate 21, the blade remover herein disclosed may be disposed so that the guide member 11 engages the ledger bar on the face oppositely from the blade 20 and the head portion 18 abuts against the rear edge of the blade 20. The thumb nut 16 may be tightened so that when the guide member 11 engages the ledger plate 21, the inner face or edge of the head portion 18 will be substantially in alinement with the inner face of the blade 20. The opposite end of the shank or handle 10 may then be struck with a hammer or other instrument, and preferably a heavy instrument or article is disposed in abutting relation to the opposite edge of the ledger plate or bar 21 so that when the inner end of the shank member 10 is struck with a hammer, the ledger plate will not be sprung out of alinement or otherwise bent. The head portion 18 will force the blade 20 outwardly and will shear off the rivet 22 holding the blade 20 on the ledger plate 21. The elongated bar 10 may be constructed of steel which is properly tempered so that it will not become bent or unduly injured in use.

While I have disclosed the guide member 11 as a separate member which is bolted onto the bar 10, I do not wish to be limited to this construction as, if desired, the bar member 11 may be constructed integrally with the bar 10.

It is, of course, understood that various changes and modifications may be made in the details of construction and design of the above specifically described embodiment of this invention without departing from the spirit thereof, such changes and modifications being restricted only by the scope of the following claims.

I claim:—

1. As a new article of manufacture, a blade removing device of the character described comprising an elongated bar having a blunt outer end, a guide member carried by the bar and extending outwardly of one end thereof, said guide member having a bifurcated end portion, and means for adjusting the guide member with respect to the bar.

2. A blade remover of the character described comprising an elongated bar having a blunt head at one end thereof, a resilient guide member carried by the bar and disposed in spaced relation to said head, stop means formed with the head inwardly of its outer end, and means for adjusting said guide member toward or away from the head.

3. A blade removing tool of the character described comprising an elongated bar having an offset blade removing head at one end thereof, an elongated resilient guide member disposed longitudinally of the bar and extending outwardly of one end thereof, means for securing the guide member to the bar, said guide member having a forked outer end portion adapted to loosely receive the head of a rivet, an adjusting bolt carried by the bar and engaging the guide whereby to adjust said guide with respect to the head thereof.

In testimony whereof I hereunto affix my signature.

ROBERT E. BREWER.